United States Patent
Chiou et al.

(10) Patent No.: US 8,035,693 B2
(45) Date of Patent: Oct. 11, 2011

(54) MICRO-OPTICAL IMAGE STABILIZER

(75) Inventors: Jin-Chern Chiou, Hsinchu (TW);
Yung-Jiun Lin, Miaoli County (TW);
Tzu-Kan Chen, Taipei (TW); Cheng-Te Tseng, Taipei (TW); Chia-Hsi Tsai, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 797 days.

(21) Appl. No.: 11/780,483

(22) Filed: Jul. 20, 2007

(65) Prior Publication Data

US 2008/0273092 A1   Nov. 6, 2008

(30) Foreign Application Priority Data

May 2, 2007   (TW) ............................... 96207004 U

(51) Int. Cl.
*H04N 5/228* (2006.01)

(52) U.S. Cl. ................ 348/208.7; 348/374; 348/208.99

(58) Field of Classification Search ............ 348/208.11, 348/208.99, 208.4, 208.7, 373–376, 218.1; 359/557

See application file for complete search history.

(56) References Cited

U.S. PATENT DOCUMENTS

| 6,676,416 B1 * | 1/2004 | Ellis et al. ................... 439/65 |
| 2006/0092514 A1 | 5/2006 | Koo et al. |
| 2008/0273092 A1 * | 11/2008 | Chiou et al. ............. 348/208.11 |

* cited by examiner

*Primary Examiner* — David Ometz
*Assistant Examiner* — Antoinette Spinks
(74) *Attorney, Agent, or Firm* — Li & Cai Intellectual Property (USA) Office

(57) ABSTRACT

A micro-optical image stabilizer is disclosed. The optical image stabilizer includes a substrate, a carrier movably disposed on the substrate for carrying an image sensor, an anchor fixed on the substrate, a conducting pad fixed on the anchor for coupling an image processing circuit, a flexible suspension disposed between the conducting pad and the carrier, a conducting line disposed on the flexible suspension coupled to the conducting pad and protruding over the carrier for coupling the image sensor, and a micro actuator disposed between the substrate and the carrier for adjusting the position of the carrier according to control signals from an actuator control circuit.

19 Claims, 16 Drawing Sheets

MICRO-OPTICAL IMAGE STABILIZER

BACKGROUND OF THE INVENTION

1. Field of the Invention

The present invention relates to an image stabilizer, and more particularly, to a micro-optical image stabilizer.

2. Description of the Prior Art

Nowadays many digital cameras emphasize on the stabilization function. One of the stabilization methods involves equipping the image sensor (such as CCD and CMOS) with an image stabilizer so as to stabilize the captured image when the image sensor is not stable. However, as the digital camera is getting smaller, the size of the image stabilizer is also getting smaller. Hence, it is proposed with the image stabilizer utilizing Micro-Electro-Mechanical System (MEMS) techniques in the prior art.

Please refer to FIG. 1. FIG. 1 is a diagram illustrating an image stabilizer 100 of MEMS. The image stabilizer 100 comprises an image processing circuit 110, an actuator control circuit 120, 4 sets of electrostatic actuators 131-134, a substrate 170, a carrier 150, an image sensor 160, and a flexible printed circuit 140. The image sensor 160 comprises an image sensing area 161. The actuator control circuit 120 is coupled to the electrostatic actuators 131-134 for controlling the movements of the electrostatic actuators 131-134. One end of each of the electrostatic actuators 131-134 is fixed on the substrate 170 and the other end of each of the electrostatic actuators 131-134 is fixed on the carrier 150. The distance between the two ends of each of the electrostatic actuators 131-134 is controlled by the actuator control circuit 120. Consequently, the position of the carrier relative to the substrate is controlled by the actuator control circuit 120. Take the electrostatic actuator 133 for example, the electrostatic actuator 133 comprises a fixed component 133a and a moveable component 133b. The fixed component 133a is fixed on the substrate 170 and the moveable component 133b is fixed to one side of the carrier 160 (as shown in FIG. 1). The distance between the fixed component 133a and the moveable component 133b is controlled by the actuator control circuit 120. For example, the higher the control voltage of the actuator control circuit 120 transmitted to the electrostatic actuator 133, the closer between the fixed component 133a and the moveable component 133b, and vice versa. Thus, the distance D is controlled by the actuator control circuit 120. The other 3 sets of the electrostatic actuators 131, 132, and 134 are also controlled in the same manner. In this way, the actuator control circuit 120 respectively controls the electrostatic actuators 131-134 for moving the carrier 150 relative to the substrate 170. The image sensor 160 is fixed on the carrier 150 but not electrically coupled to the carrier 150. Therefore, the image sensor 160 moves as the carrier 150. The image sensing area 161 is disposed for sensing optical signals and accordingly generating electrical signals. The image processing circuit 110 is coupled to the image sensor 160 through the flexible printed circuit 140 for receiving the electrical signals from the image sensor 160 and accordingly generating digital images. Thus, when the substrate 170 is moving, the actuator control circuit 120 transmits control signals to the electrostatic actuators 131-134 so as to move the carrier 150 in the opposite direction. Thus, the movement of the substrate 170 does not affect the image sensor 160 and the captured images are stabilized.

Please refer to FIG. 2. FIG. 2 is a diagram illustrating the fabrication of the conventional image stabilizer 100. As shown in FIG. 2, after the electrostatic actuators 131-134 and the carrier 150 are fabricated onto the substrate 170, the image sensor 160 is attached onto the carrier 150, and then the flexible printed circuit 140 is electrically and mechanically coupled to the image sensor 160. The image sensor 160 is equipped with a plurality of conducting pads 162 and the flexible printed circuit 140 is correspondingly equipped with a plurality of pins 141. In fabrication, the conducting pads 162 is applied with tin paste, then the flexible printed circuit 140 is fixed on the conducting pad 162 with glue, and the combination of the flexible printed circuit 140 and the image sensor 160 are heated so as to couple the pin 141 of the flexible printed circuit 140 onto the conducting pad 162 of the image sensor 160.

It is known from the above that the conventional image stabilizer 100 needs two steps for fabrication of the image sensor: 1. glue the image sensor 160 onto the carrier 150, and 2. couple the flexible printed circuit 140 onto the image sensor 160. The two steps are complicated for production, which is inconvenient.

Additionally, in the conventional image stabilizer 100, because the flexible printed circuit 140 is electrically and mechanically coupled to the image sensor 160, when the movement of the carrier 150 relative to the substrate 170 is generated, the presence of the flexible printed circuit 140 interferes with the movement. For example, the flexible printed circuit 140 generates force onto the carrier 150 when the flexible printed circuit 140 is squeezed or pulled, which interferes the movement of the carrier 150. Besides, it is unknown of the force generated by the flexible printed circuit 140. Therefore, the position of the carrier 150 is also affected by the flexible printed circuit 140, which is different from the ideal position.

SUMMARY OF THE INVENTION

The present invention provides a micro-optical image stabilizer for stabilizing an image sensed by an image sensor. The micro-optical image stabilizer comprises a substrate, a carrier moveably disposed on the substrate for carrying the image sensor, an anchor fixed on the substrate, a first conducting pad fixed on the anchor for coupling an image processing circuit, a flexible suspension disposed between the anchor and the carrier, a conducting line disposed on the flexible suspension, the conducting line comprising a first end coupled to the first conducting pad, and a second end protruded over the carrier through the flexible suspension, a second conducting pad disposed on the carrier coupled to the conducting line for coupling the image sensor, and a micro-actuator disposed between the carrier and the substrate coupled to an actuator controlling circuit for adjusting a position of the carrier relative to the substrate according to control signals transmitted from the actuator controlling circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
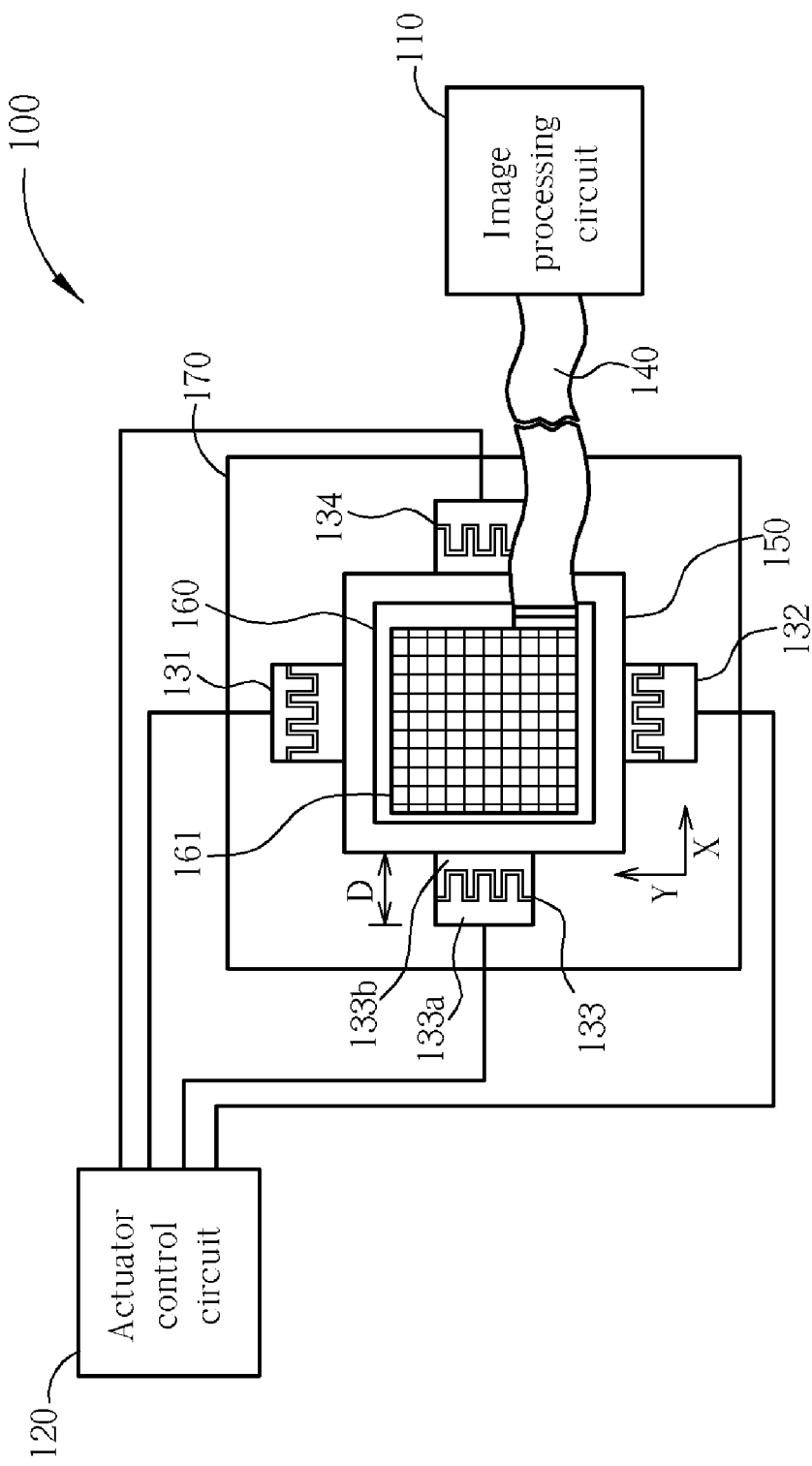
FIG. 1 is a diagram illustrating an image stabilizer of MEMS.
Figure 2:
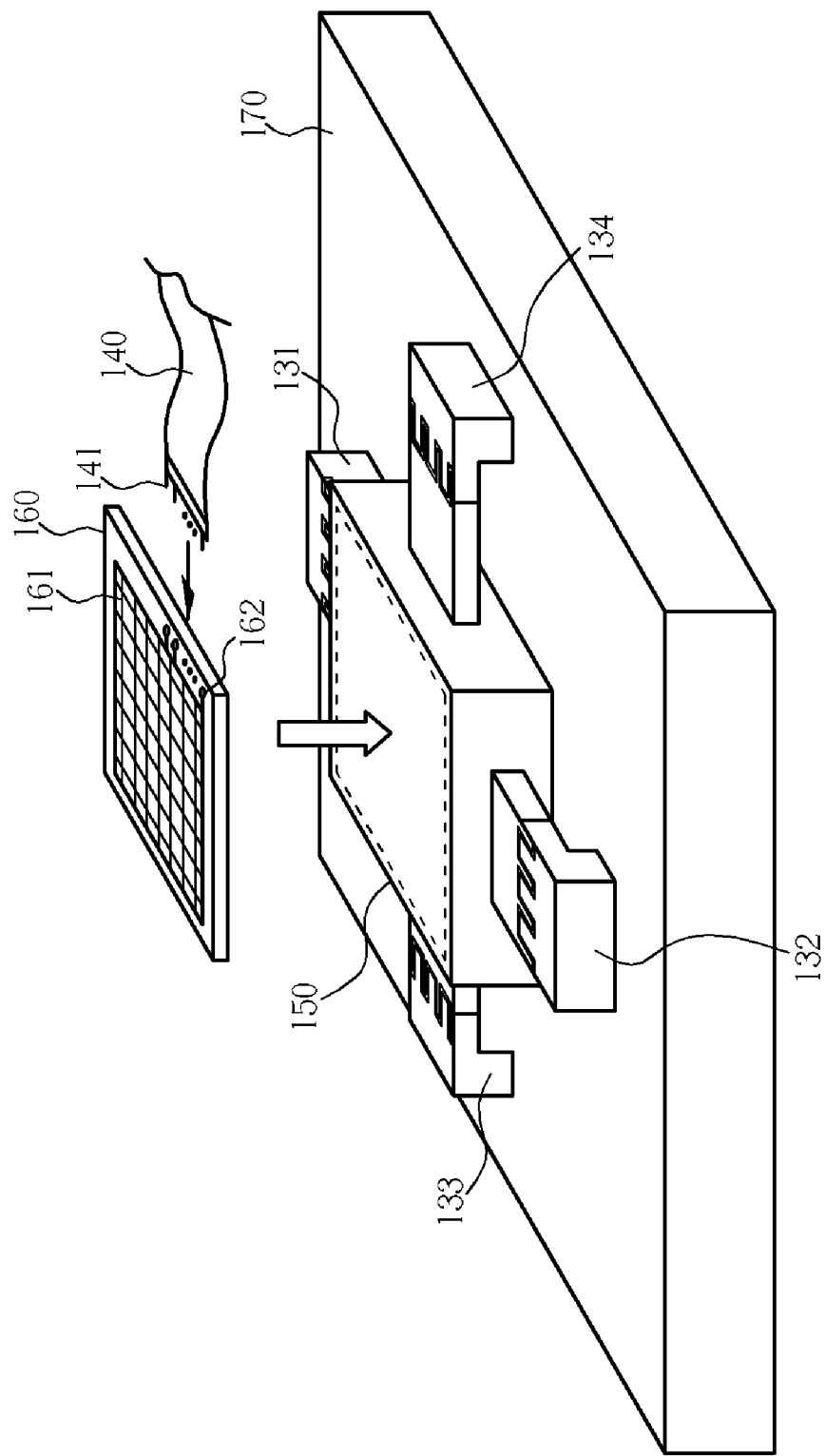
FIG. 2 is a diagram illustrating the fabrication of the conventional image stabilizer.
Figure 3:
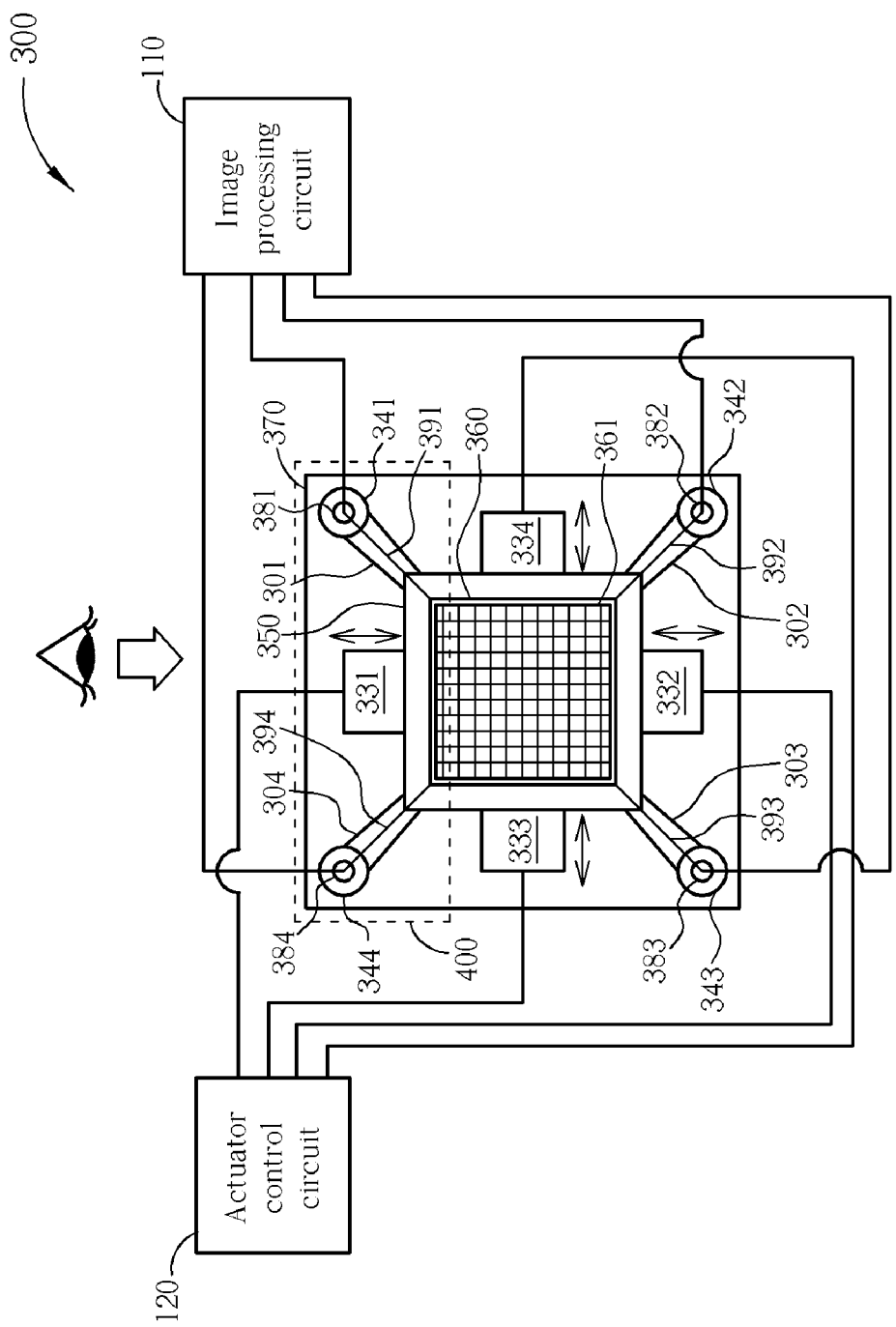
FIG. 3 is a diagram illustrating a first embodiment according to the micro-optical image stabilizer of the present invention.

Please refer to FIG. 3. FIG. 3 is a diagram illustrating a first embodiment according to the micro-optical image stabilizer 300 of the present invention. The image stabilizer 300 comprises an image processing circuit 110, an actuator control circuit 120, 4 sets of actuators 331-334, a substrate 370, a carrier 350, an image sensor 360, 4 anchors 341-344, 4 conducting pads 381-384, 4 conducting lines 391-394, 4 conducting pads 3811-3844 (not shown), and 4 flexible suspensions 301-304. The image sensor 360 comprises an image sensing area 361. The actuator control circuit 120 is coupled to the actuators 331-334 for controlling the movement of the actuators 331-334. One end of each of the actuators 331-334 is fixed on the substrate 370 and the other end of each of the actuators 331-334 is fixed on the carrier 350. In this way, the actuator control circuit 120 respectively controls the actuators 331-334 so as to move the position of the carrier 350 relative to the substrate 370 in the X direction or the Y direction. The anchors 341-344 are fixed on the substrate 370. The conducting pads 381-384 are respectively fixed on the anchors 341-344. The flexible suspensions 301-304 are respectively coupled to the anchors 341-344 and the carrier 350 for stabilizing the carrier 350 at a default position when the actuators 331-334 do not move and carrying the conducting lines 391-394. One end of each of the conducting lines 391-394 is coupled to the a corresponding conducting pad of the conducting pads 381-384 and the other end of each of the conducting lines 391-394 is protruding over the carrier 350 and fixed on the carrier 350 (not coupled). The conducting pads 3811-3844 are respectively coupled to the conducting lines 391-394 and fixed on the carrier 350 (not coupled). The image sensor 360 is fixed on the carrier 350 but not coupled to the carrier 350. The image sensor 360 is coupled to the conducting pads 391-394 through the conducting pads 3811-3844 by wire bonding or flip chip bonding. In this way, the image sensor 360 moves as the carrier 350 moves. The image sensing area 360 is disposed for receiving optical images and accordingly generating electrical signals. The image processing circuit 110 is coupled to the conducting pads 381-384 so that the image processing circuit 110 receives the electrical signals of the image sensing area 361 through the conducting pads 381-384, the conducting lines 391-394, and the conducting pads 3811-3844. Therefore, when the substrate 370 is shaken, the actuator control circuit 120 transmits control signals to the actuator 331-334 so as to make movement of the carrier 350 for eliminating effect of the substrate shaking to the image sensor 360. Thus, when the substrate 370 is shaken, the image sensor 360 is not affected by the substrate shaking and the received images are stable. Consequently, the image processing circuit 110 generates stable images. Additionally, the positions and amounts of the anchors, conducting pads, conducting lines, and the flexible suspensions are changed according to the user's needs.

Figure 4:
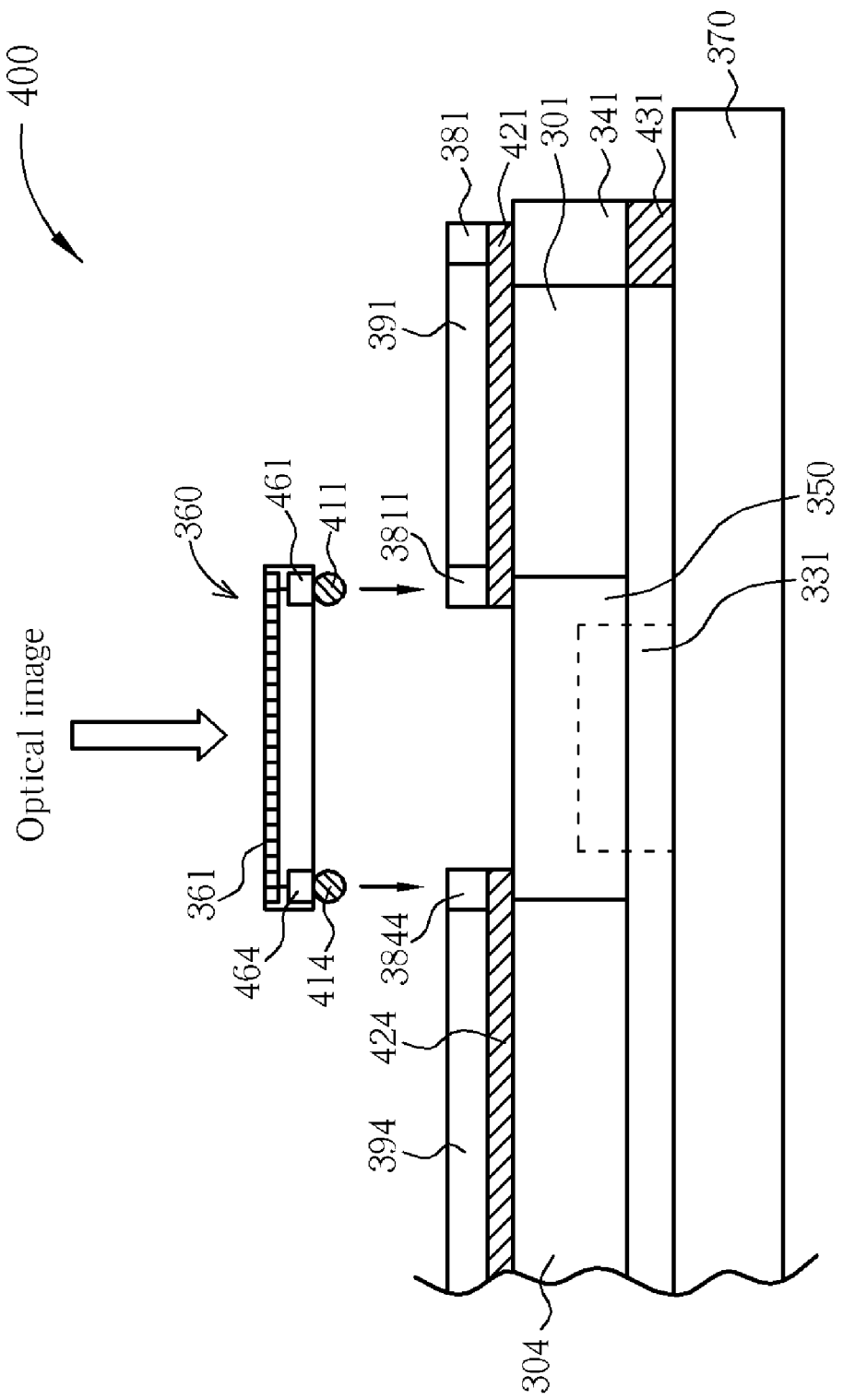
FIG. 4 is a diagram illustrating a cross-section of the image stabilizer of the present invention fabricated by flip chip bonding.

Please refer to FIG. 4. FIG. 4 is a diagram illustrating a cross-section of the image stabilizer 300 of the present invention fabricated by flip chip bonding. In FIG. 4, the cross-section is set along the line from the anchors 381 and 384 (as the indication 400 in FIG. 3). However, for brevity, the actuator is not shown in FIG. 4 (only depicted as the dotted lines). In FIG. 4, in fact, the anchor 341 is fixed on the substrate 370 through an insulation layer 431 so as to ensure the insulation between the anchor 341 and the substrate 370. The flexible suspension 301 is coupled between the carrier 350 and the anchor 341. The conducting pads 381 and 3811, and the conducting line 391 are respectively fixed on the carrier 350 and the flexible suspension 301 through the insulation layer 421 so as to ensure insulation between the conducting pads 381, 3811 and the carrier 350, and the conducting line 391 and the suspension 301. The image sensor 360 is further equipped with conducting pads 461 and 464 on the opposite side to the image sensing area 361 for coupling to the conducting lines 391 and 394. The conducting pads 461 and 464 of the image sensor 360 are respectively coupled to the conducting lines 391 and 394 by the flip chip bonding. The flip chip technology comprises many methods for bonding, which is well known by those skilled in the art, and is omitted. The present invention only take one embodiment for example: 1. The conducting pads 461 and 464 are respectively glued with tin balls 411 and 414. 2. The conducting pads 461 and 464 are further respectively coupled to the image sensing area 361. 3. The image sensor 360 is put onto the precise position of the carrier 350, and then is heated. In this way, the tin balls 411 and 414 are melted so that the conducting pad 461 and the conducting line 391 are coupled and the conducting pad 464 and the conducting line 394 are coupled. Consequently, the image processing circuit 110, after the fabrication of the image sensor 360, receives the electrical signals from the image sensor 360 through the conducting pad 381, the conducting line 391, the conducting pad 3811, the conducting pad 461, and the image sensing area 361.

Figure 12:
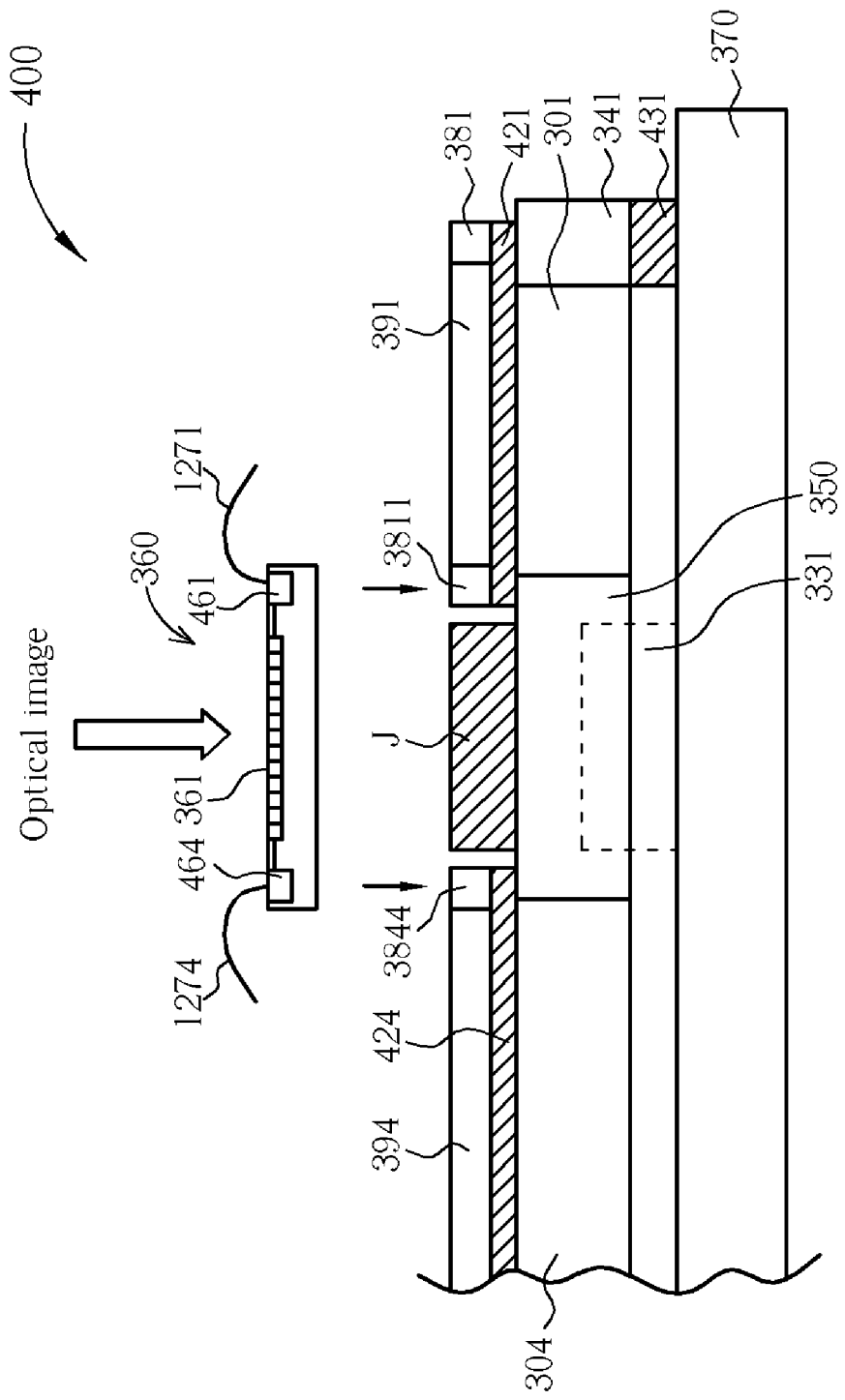
FIG. 12 is a diagram illustrating the first embodiment of the image stabilizer of the present invention fabricated by wire bonding.

Please refer to FIG. 12. FIG. 12 is a diagram illustrating the first embodiment of the image stabilizer 300 of the present invention fabricated by wire bonding. The cross-section shown in FIG. 12 is along the line from the anchor 381 and 384 (as the indication 400 shown in FIG. 3). For brevity, the actuator 331 is shown by dotted lines. In FIG. 12, the anchor 341 is fixed on the substrate through an insulation layer 431 for ensuring insulation. The flexible suspension 301 is coupled between the carrier 350 and the anchor 341. The conducting pads 381, 3811, and the conducting line 391 are fixed on the flexible suspension 301 and the carrier 350 through an insulation layer 421 for ensuring insulation. The image sensor 360 is equipped with conducting pads 461 and 464 around the image sensing area 361 for coupling to the conducting lines 391 and 394. The conducting lines 1271 and 1274 are coupled to the conducting pads 3811 and 3844 by wire bonding. The wire bonding technology comprises many methods, which is well known by the skilled in the art, and is omitted. The present invention only takes one example: 1. The conducting pads 461 and 464 are respectively coupled to the conducting lines 1271 and 1274 by wire bonding. 2. The conducting lines 1271 and 1274 are further coupled to the conducting pads 3811 and 3844. In this way, the image processing circuit 110, after the fabrication of the image sensor 360, receives the electrical signals of the image sensor 360 from the image sensor 360 through the conducting pad 381, the conducting line 391, the conducting pad 3811, the conducting line 1271, the conducting pad 461, and the image sensing area 361. Additionally, the carrier 350 is also equipped with nonconducting glue J for gluing the image sensor 360.

Figure 5:
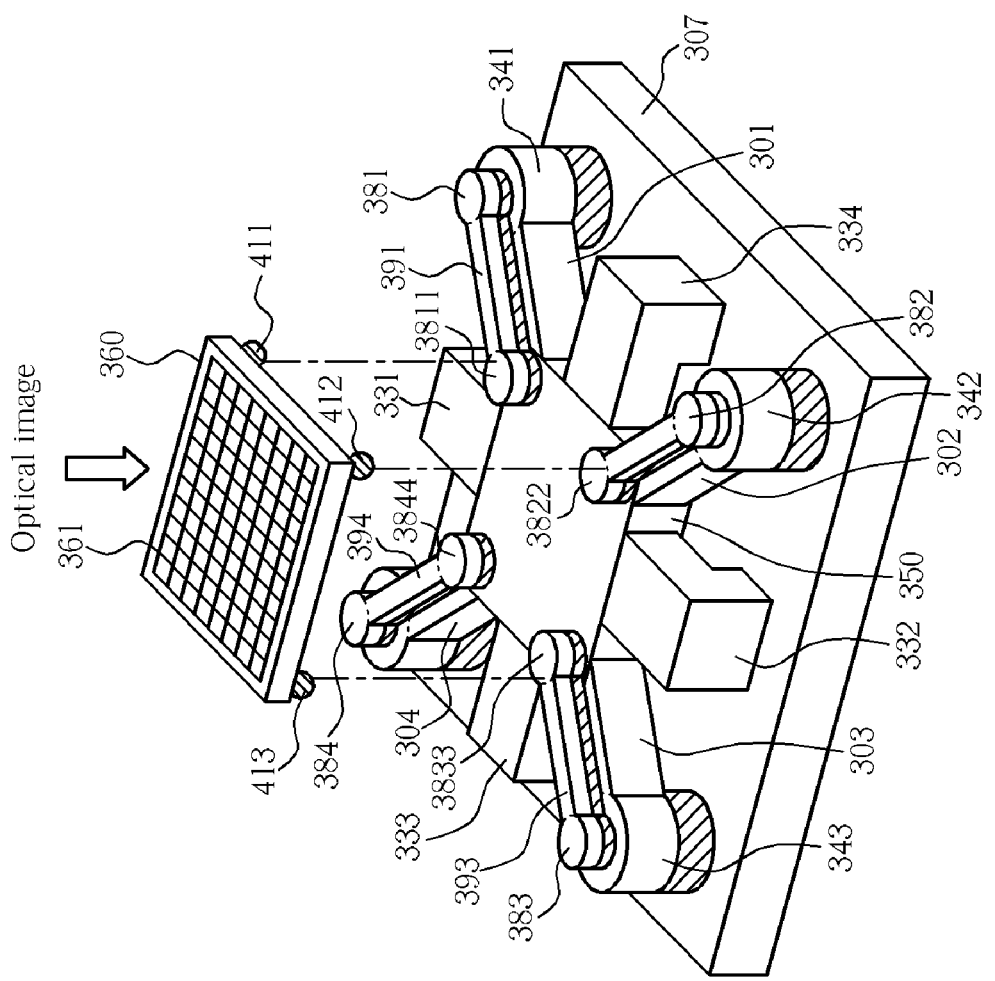
FIG. 5 is a diagram illustrating the first embodiment of the image stabilizer of the present invention fabricated by flip chip bonding.

Please refer to FIG. 5. FIG. 5 is a diagram illustrating the first embodiment of the image stabilizer 300 of the present invention fabricated by flip chip bonding. The flip chip technology comprises many methods, which is well known by those skilled in the art, and is omitted. The present invention takes only one for example: 1. The image sensor 360 is attached with tin balls 411-414. 2. The image sensor 360 is put to the precise position and then is heated. Thus, the fabrication is complete. The fabrication of the present invention is much easier, which increases convenience.

Figure 13:
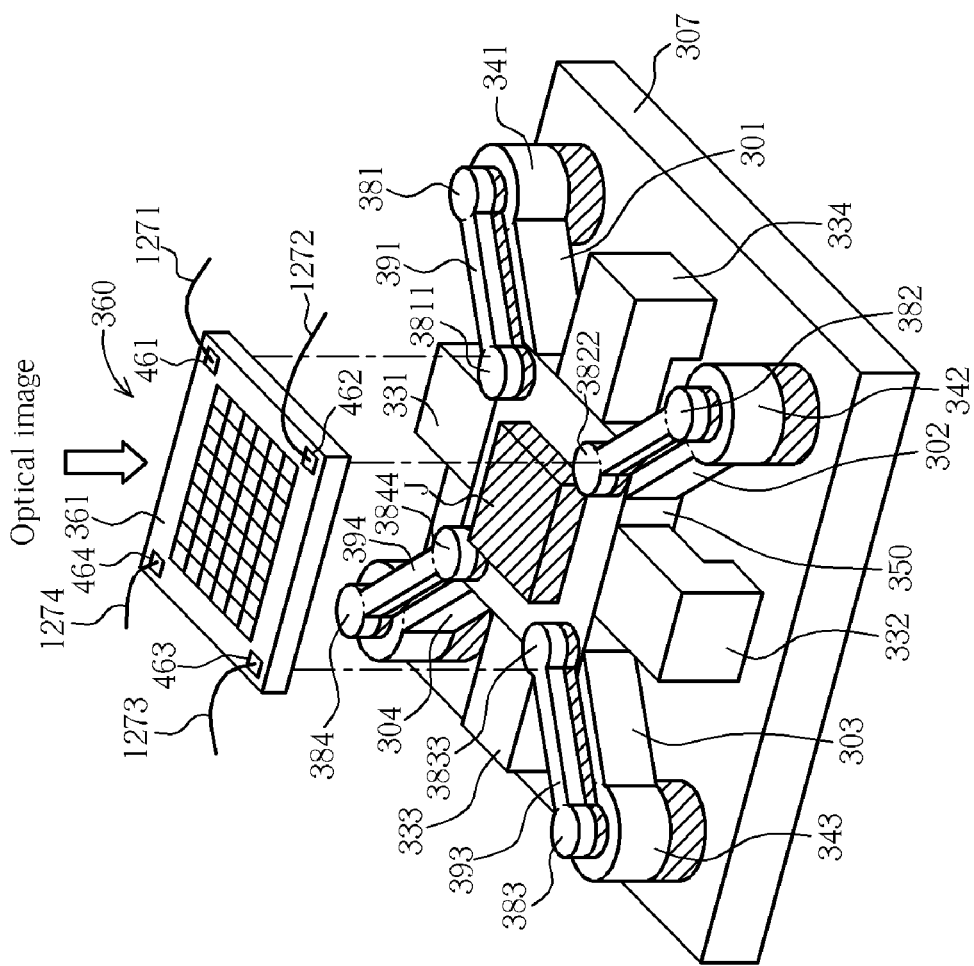
FIG. 13 is a diagram illustrating the first embodiment of the image stabilizer of the present invention fabricated by wire bonding.

Please refer to FIG. 13. FIG. 13 is a diagram illustrating the first embodiment of the image stabilizer 300 of the present invention fabricated by wire bonding. As shown in FIG. 13, the present invention utilizes wire bonding technology to fabricate the image sensor 360, which is much easier and increases convenience.

Figure 6:
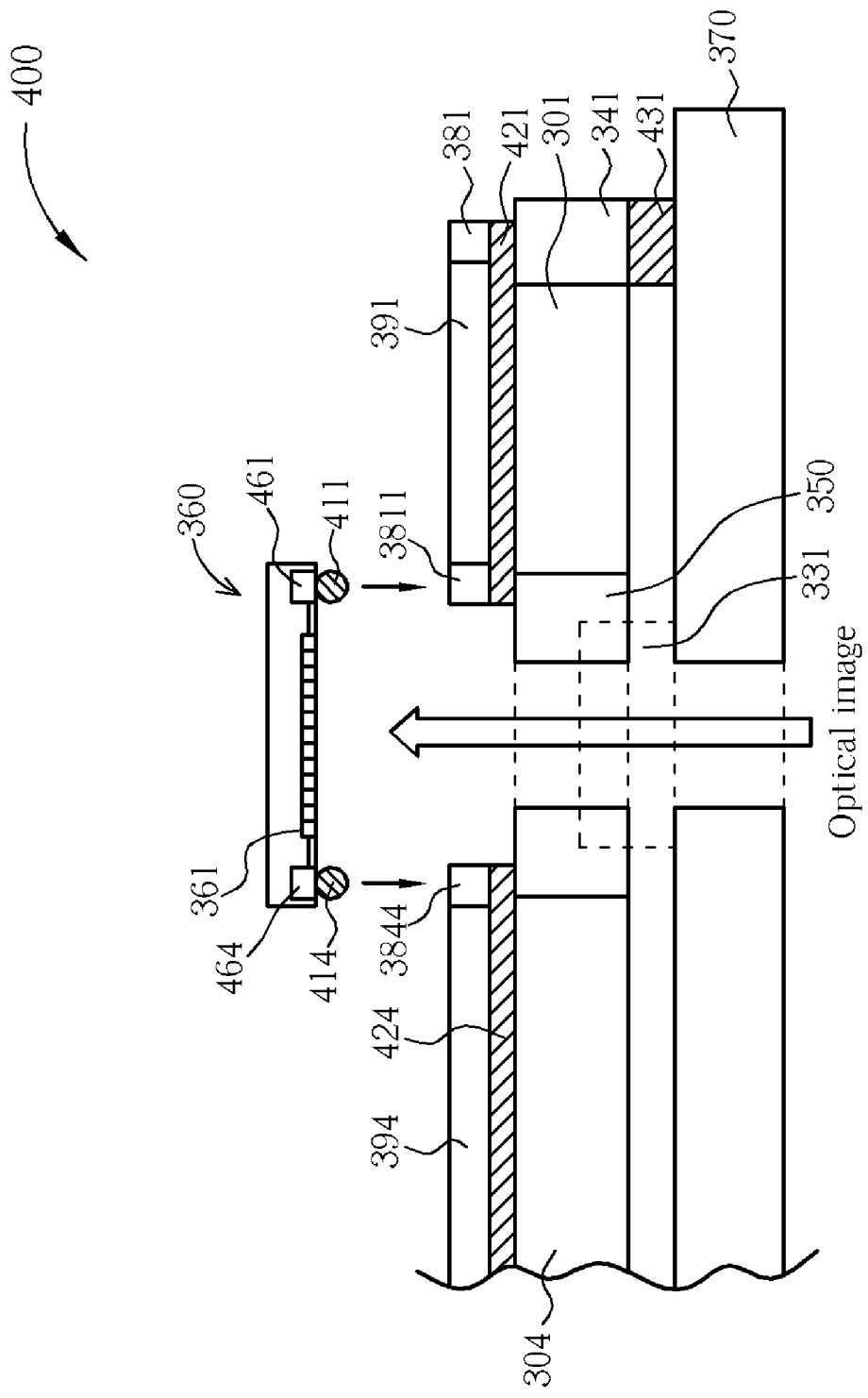
FIG. 6 is a diagram illustrating the cross-section of the second embodiment of the image stabilizer of the present invention fabricated by flip chip bonding.

Please refer to FIG. 6. FIG. 6 is a diagram illustrating the cross-section of the second embodiment of the image stabilizer 300 of the present invention fabricated by flip chip bonding. FIG. 6 is similar to FIG. 4 and the difference is: in FIG. 6, the image sensing area 361 is set between the image sensor 360 and the substrate 370. Consequently, the carrier 350 and the substrate 370 have to be accordingly disposed with holes to provide optical paths for the images. Thus, the optical images form on the image sensing area 361 through the substrate 370. Therefore, according to FIG. 4 and FIG. 6, users have two choices to design the image sensor 360 and the image sensing area 361, which increases convenience.

Figure 14:
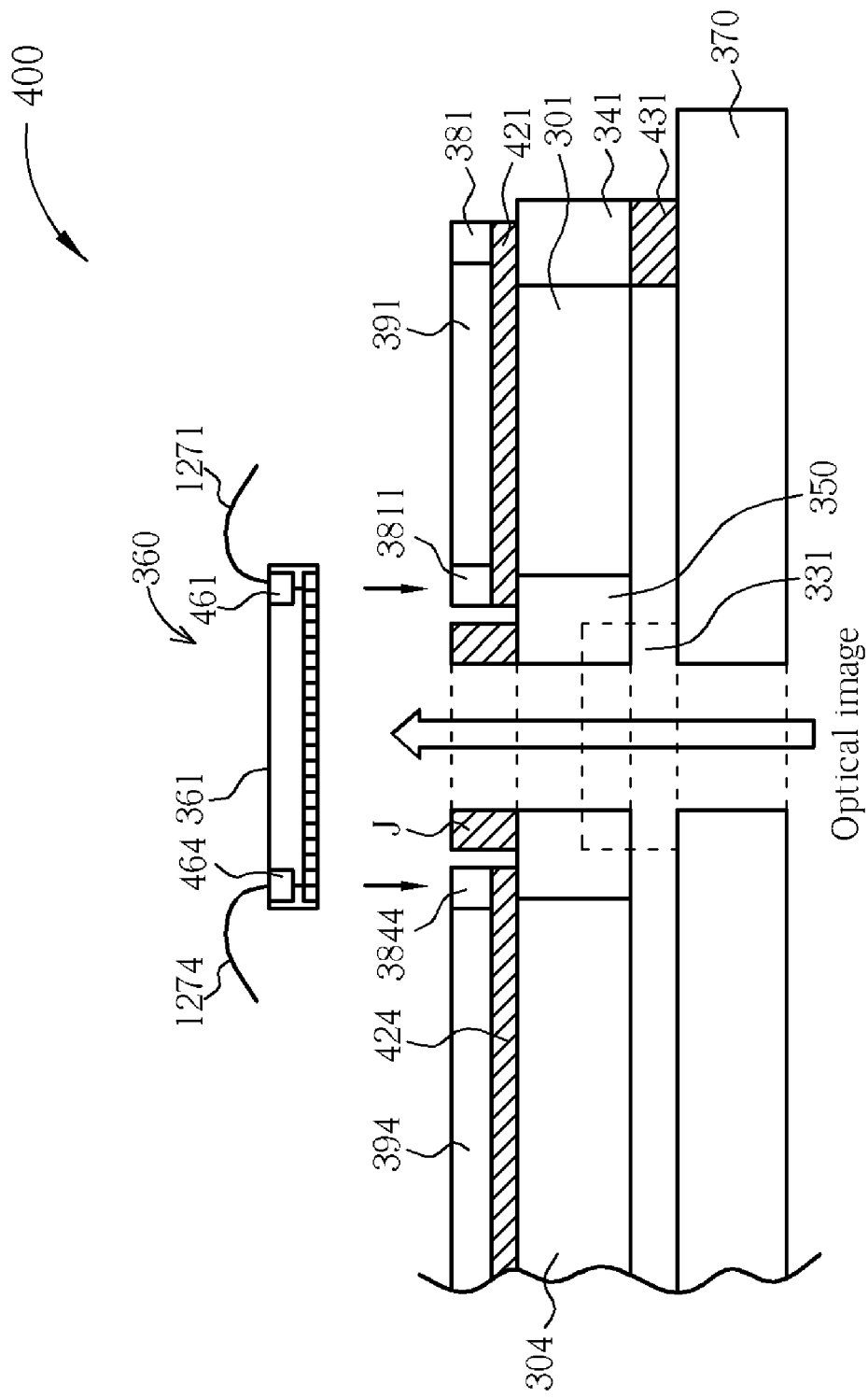
FIG. 14 is a diagram illustrating the second embodiment of the image stabilizer of the present invention fabricated by wire bonding.

Please refer to FIG. 14. FIG. 14 is a diagram illustrating the second embodiment of the image stabilizer 300 of the present invention fabricated by wire bonding. FIG. 14 is similar to FIG. 12 and the difference is: in FIG. 14, the image sensing area 361 is set between the image sensor 360 and the substrate 370. The related fabrication of FIG. 14 is same as FIG. 12, which is omitted. Therefore, the substrate 370 and the carrier 350 have to be equipped with holes accordingly to provide optical paths for images. In this way, the optical images form on the image sensing area 361 through the substrate 370.

Figure 7:
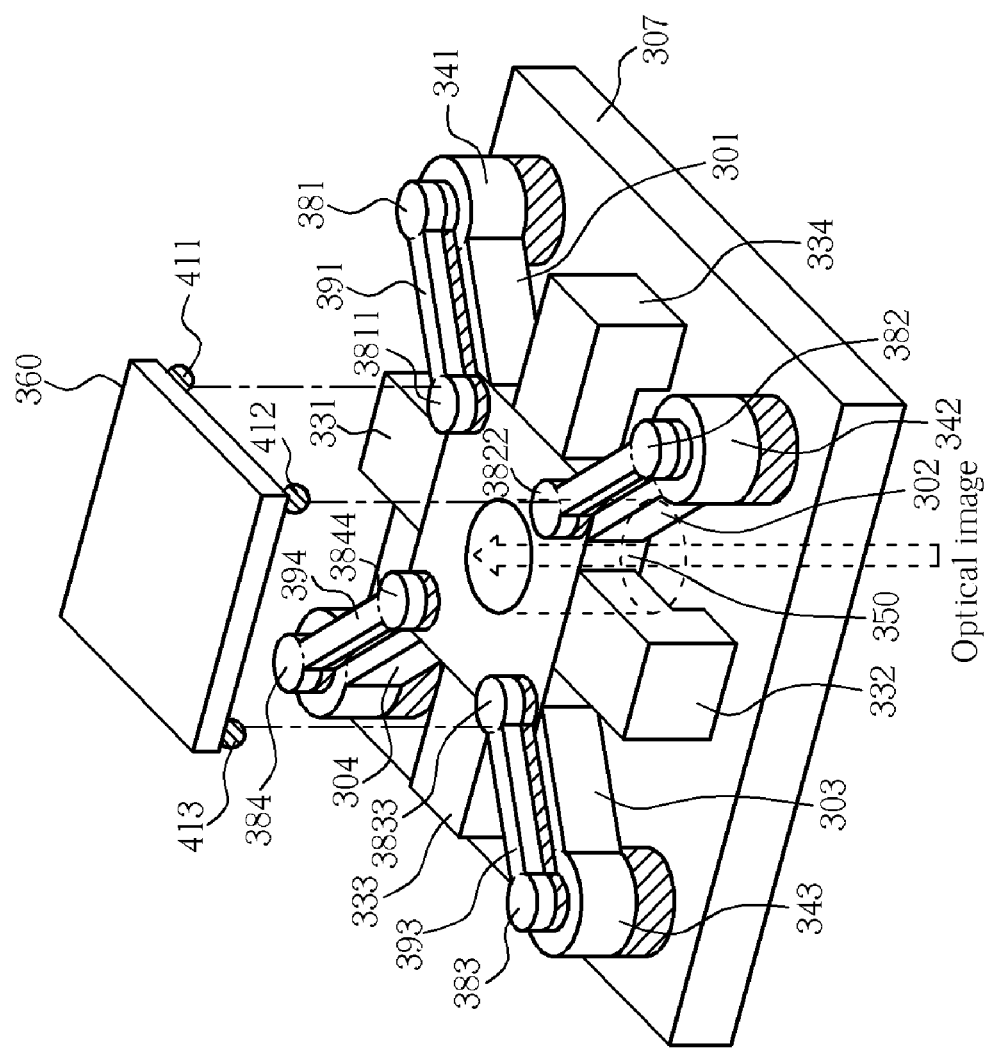
FIG. 7 is a diagram illustrating the second embodiment of the image stabilizer of the present invention fabricated by flip chip bonding.

Please refer to FIG. 7. FIG. 7 is a diagram illustrating the second embodiment of the image stabilizer 300 of the present invention fabricated by flip chip bonding. As shown in FIG. 7, the fabrication of the image stabilizer 300 of the present invention can be executed with the following steps: 1. The image sensor 360 is attached with tin balls 411-414. 2. The image sensor 360 is put to the precise position and is heated. In this way, the fabrication is complete. The fabrication of the present invention is much easier, which increases convenience.

Figure 15:
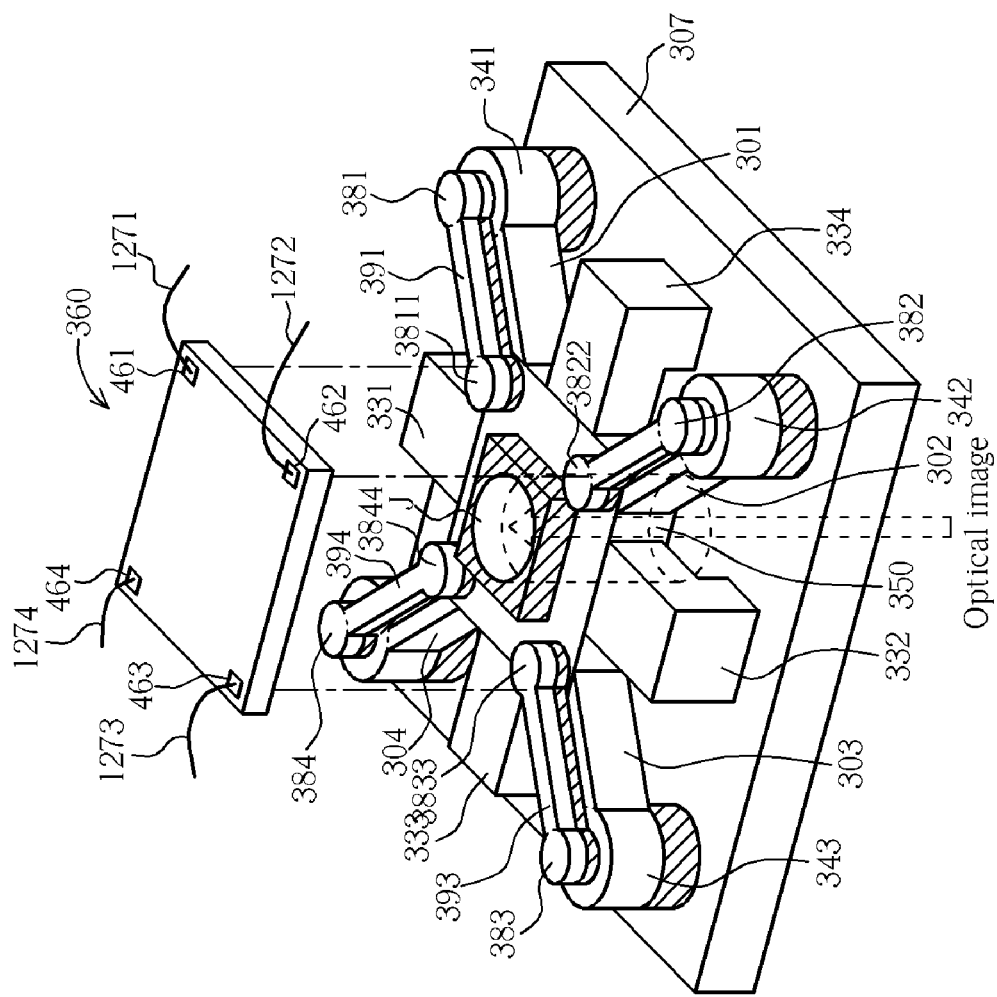
FIG. 15 is a diagram illustrating the second embodiment of the image stabilizer of the present invention fabricated by wire bonding.

Please refer to FIG. 15. FIG. 15 is a diagram illustrating the second embodiment of the image stabilizer 300 of the present invention fabricated by wire bonding. As shown in FIG. 15, the fabrication of the image stabilizer 300 of the present invention can be executed with wire bonding technology, which is much easier and increases convenience.

Figure 8:
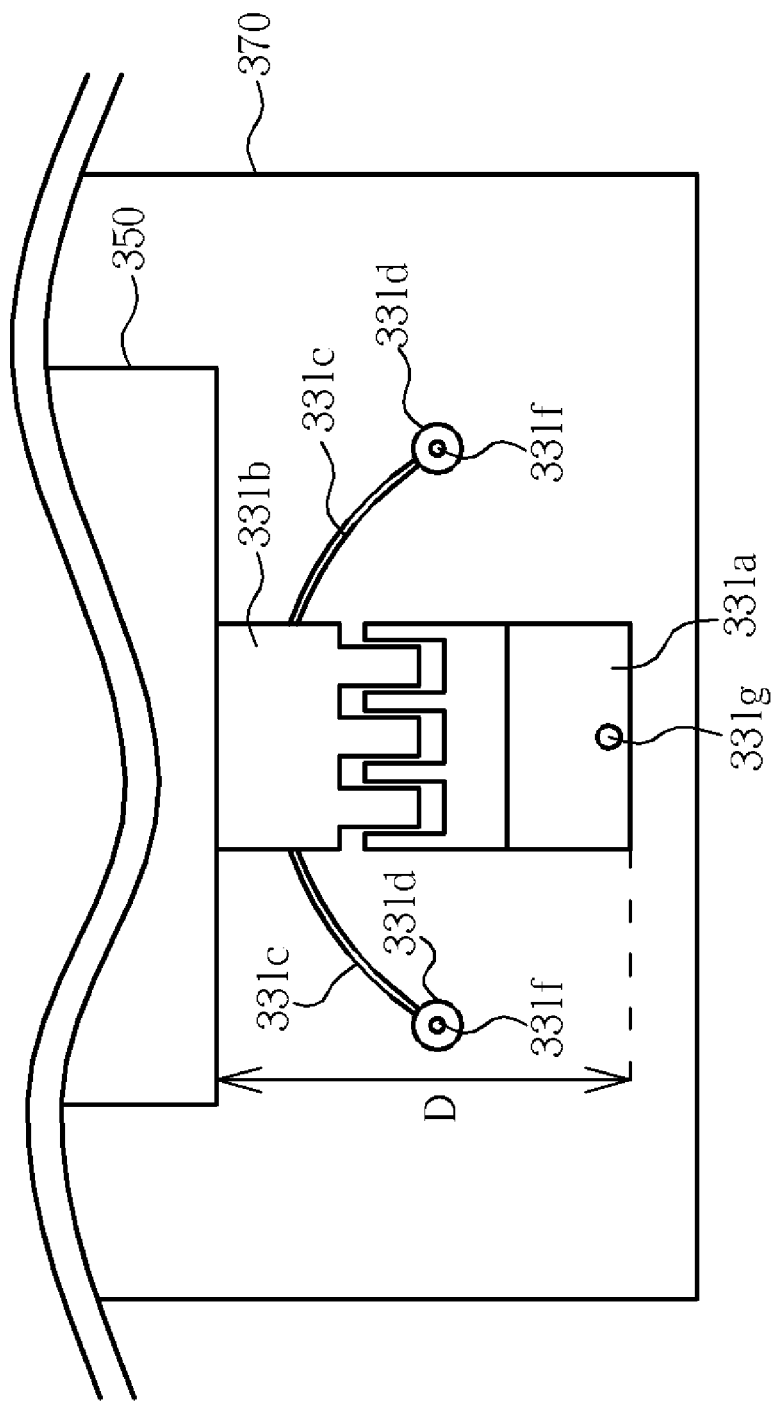
FIG. 8 is a diagram illustrating the electrostatic actuator of the present invention.

Please refer to FIG. 8. FIG. 8 is a diagram illustrating the electrostatic actuator of the present invention. The actuators 331-334 can be realized with the electrostatic actuators shown in FIG. 8. Take the actuator 331 for example. As shown in FIG. 8, the electrostatic actuator 331 comprises a fixed component 331a and a moveable component 331b. Both of the fixed component 331a and the moveable component 331b are composed of comb structures. The fixed component 331 comprises conducting pad 331g so that the actuator control circuit 120 transmits a voltage Va to the conducting pad 331g and the voltage Va is received by the fixed component 331a. The moveable component 331b comprises a flexible suspension 331c, an anchor 331d, and a conducting pad 331f. The anchor 331d is fixed on the substrate 370. The conducting pad 331f is fixed on the anchor 331d. Thus, the actuator control circuit 120 transmits a voltage Vb to the moveable component 331b through the conducting pad 331f and the flexible suspension 331c. Therefore, the electrostatic actuator 331 controls the distance D2 between the moveable component 331b and the fixed component 331a and thus the distance D is controlled. In this way, the position of the carrier 350 relative to the substrate 370 is controlled.

Figure 16:
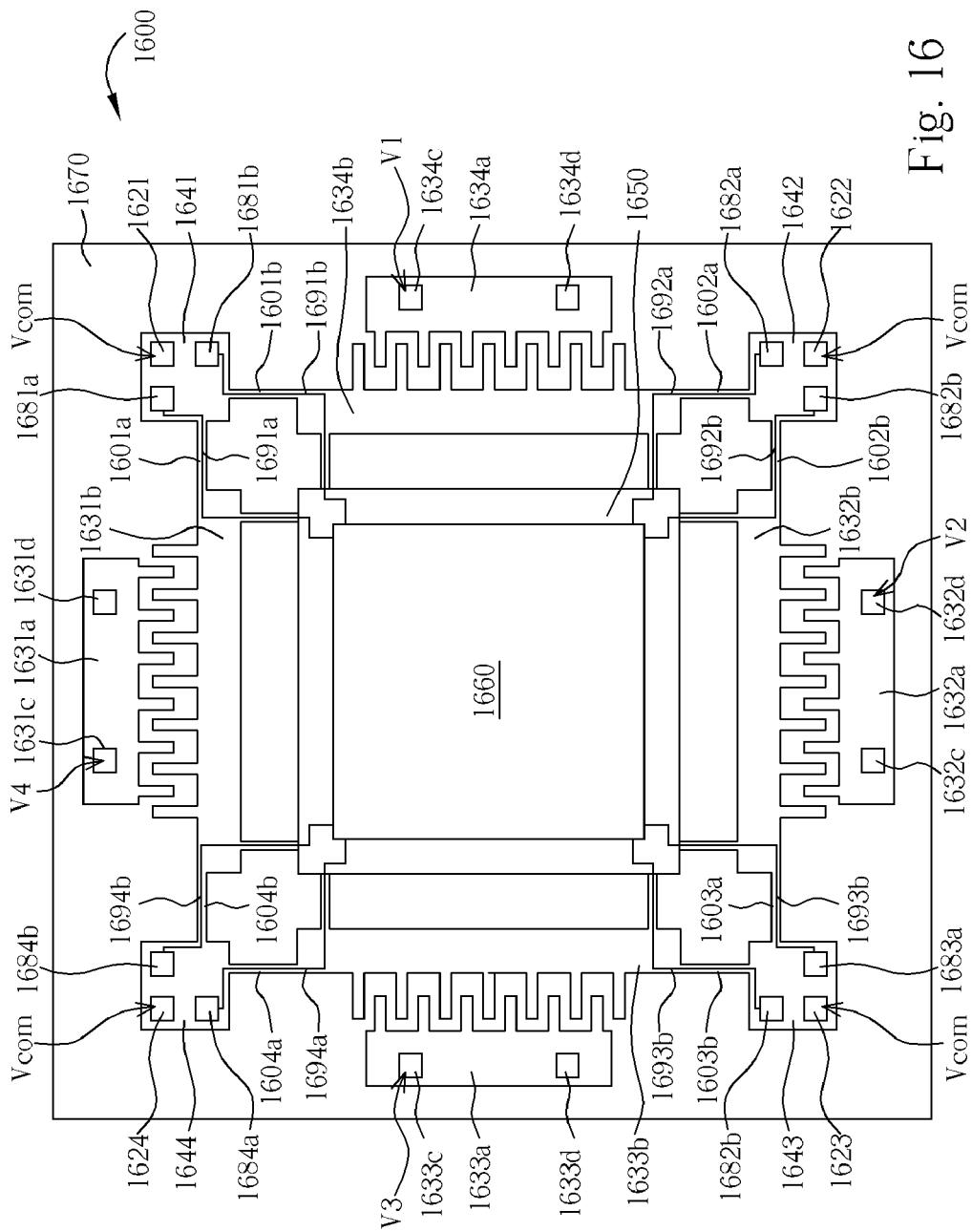
FIG. 16 is a diagram illustrating the micro-electrostatic-actuating image stabilizer of the present invention.

Please refer to FIG. 16. FIG. 16 is a diagram illustrating the micro-electrostatic-actuating image stabilizer 1600 of the present invention. The image stabilizer 1600 utilizes the electrostatic actuator shown in FIG. 8. The image stabilizer 1600 comprises a substrate 1670, a carrier 1650, 4 anchors 1641-1644, 4 conducting pads 1621-1624, 4 conducting pads 1681a-1684a, fixed components 1631a-1634a, moveable components 1631b-1634b, 4 conducting pads 1631c-1634c, 4 conducting pads 1631d-1634d, 4 flexible suspensions 1601a-1604a, 4 flexible suspensions 1601b-1604b, 4 conducting lines 1691a-1694a, 4 conducting lines 1691b-1694b. The carrier 1650 is disposed for carrying the image sensor 1660 and coupling to the moveable components 1631b-1634b. The anchors 1641-1644 are fixed on the substrate 1670 and insulated to the substrate 1670 with an insulation layer. The anchors 1641-1644 are utilized for fixing the moveable components 1631b-1634b. The anchors 1641-1644, the moveable components 1631b-1634b, the flexible suspensions 1601a-1604a, and the flexible suspensions 1601b-1604b are generated from a same layer etched in semiconductor process and all of them are coupled together. Thus, the anchors 1641-1644 are respectively equipped with the conducting pads 1621-1624 for receiving a common voltage Vcom. In this way, the moveable components 1631b-1634b have a same voltage Vcom. The anchors 1641-1644 are further respectively equipped with conducting pads 1681a-1684a and 1681b-1684b. There are insulation layers disposed between the anchors 1641-1644 and the conducting pads 1681a-1684a and 1681b-1684b for insulation. The conducting pads 1681a-1684a and 1681b-1684b are respectively coupled to the conducting lines 1691a-1694a and 1691b-1694b for receiving signals from the image processing circuit and transmitting the received signals to the image sensor 1660 through the conducting lines 1691a-1694a and 1691b-1694b. The conducting lines 1691a-1694a and 1691b-1694b are disposed by the manner describe above respectively on the flexible suspensions 1601a-1604a and 1601b-1604b. There are insulation layers disposed between the conducting lines 1691a-1694a and 1691b-1694b and the flexible suspensions 1601a-1604a and 1601b-1604b for insulation. The conducting lines 1691a-1694a and 1691b-1694b are coupled to the image sensor 1660 by the manner described above (such as tin balls). The fixed components 1631a-1634a are fixed on the substrate 1670. The conducting pads 1631c-1634c, 1631d-1634d are respectively disposed on the fixed components 1631a-1634a. The conducting pads 1631c-1634c are disposed for respectively receiving voltages V1-V4 so that the moveable components 1631b-1634b respectively have voltages V1-V4. For example, the fixed component 1631a has the voltage Vcom and the moveable component 1631b has the voltage V1, and the distance between the fixed component 1631a and the moveable component 1631b are decided by the difference between the voltages Vcom and V1. Therefore, the user can adjust movements of all electrostatic actuators by changing voltages V1-V4. Additionally, the conducting pads 1631d-1634d are disposed for respectively measuring equivalent capacitances and positions between the fixed and moveable components of the electrostatic actuators.

Figure 9:
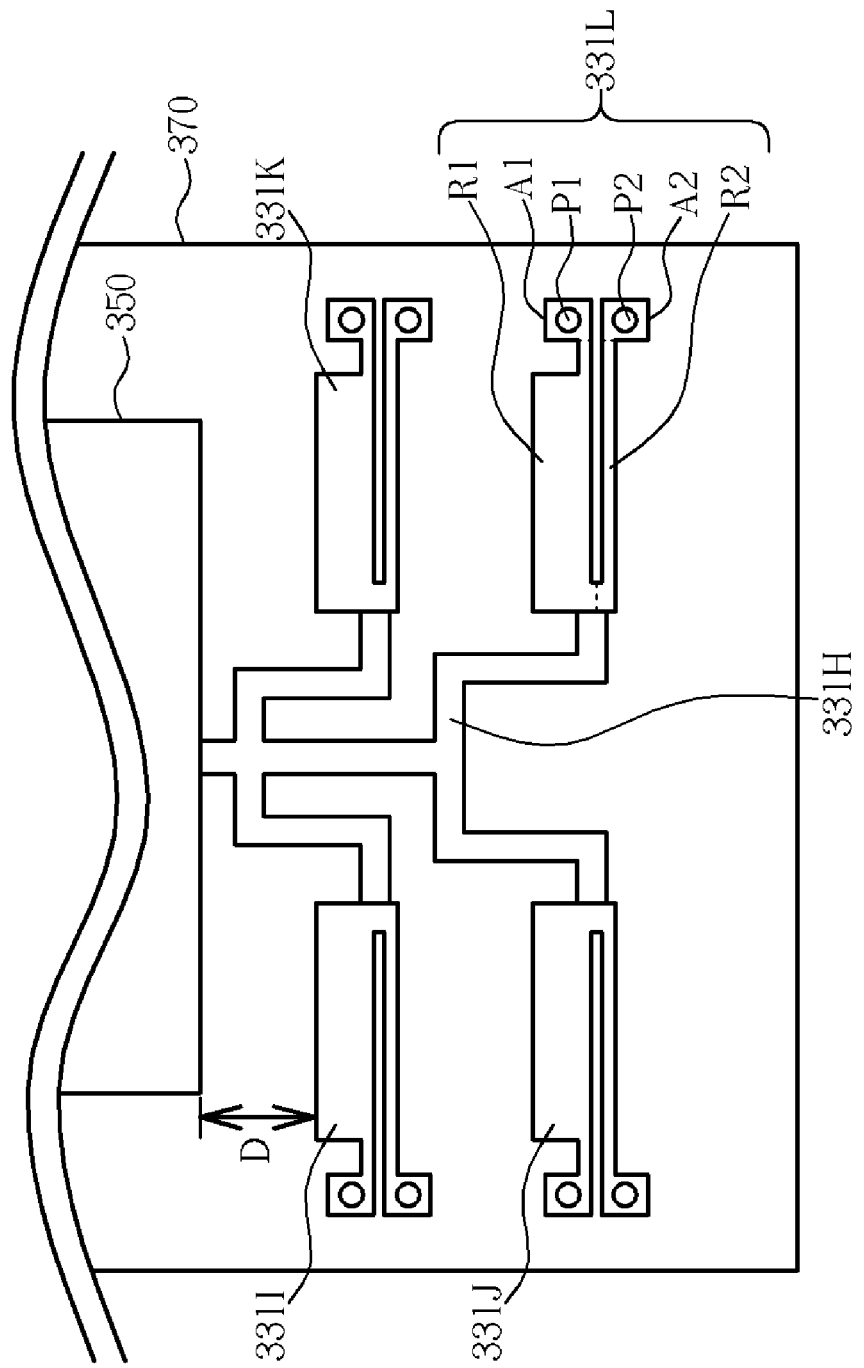
FIG. 9 is a diagram illustrating the thermoelectric actuator of the present invention.

Please refer to FIG. 9. FIG. 9 is a diagram illustrating the thermoelectric actuator of the present invention. The actuators 331-334 can be realized with the thermoelectric actuators shown in FIG. 9. Take the actuator 331 for example. As shown in FIG. 9, the thermoelectric actuator 331 comprises 4 resistors 331I, 331J, 331K, and 331L, and a pivot 331H. The structures of the 4 resistors 331I-331L are the same and the resistor 331L is taken as an example. The resistor 331L comprises two anchors A1 and A2, 2 conducting pads P1 and P2, a high-resistance resistor R2 and a low-resistance resistor R1. The anchors A1 and A2 are fixed on the substrate 370. The conducting pads are respectively fixed on the anchors A1 and A2. One end of the high-resistance resistor R2 is coupled to the anchor A2 and the other end of the high-resistance resistor R2 is coupled to the low-resistance resistor R1. One end of the low-resistance resistor R1 is coupled to the anchor A1 and the other end of the low-resistance resistor R1 is coupled to the high-resistance resistor R2. The pivot 331H is coupled to the resistors R1 and R2. The resistor R1 has low resistance and the resistor R2 has high resistance. Thus, when a current passes through the high-resistance resistor R2 and the low-resistance resistor R1, the heat energies generated by the resistors R1 and R2 are different and the expansions of the resistors R1 and R2 are different. Therefore, the thermoelectric actuator utilizes the current passing through the resistors R1 and R2 to control the expansions of the resistors R1 and R2, and thus the distance D is controlled. Thus, the actuator control circuit 120 transmits voltages Va and Vb respectively to the conducting pads A1 and A2. The difference between the voltages Va and Vb decides the current passing through the resistors R1 and R2. In this way, the thermoelectric actuator 331 controls the distance D and the position of the carrier 350 relative to the substrate 370 by controlling the difference between the voltages Va and Vb.

Figure 10:
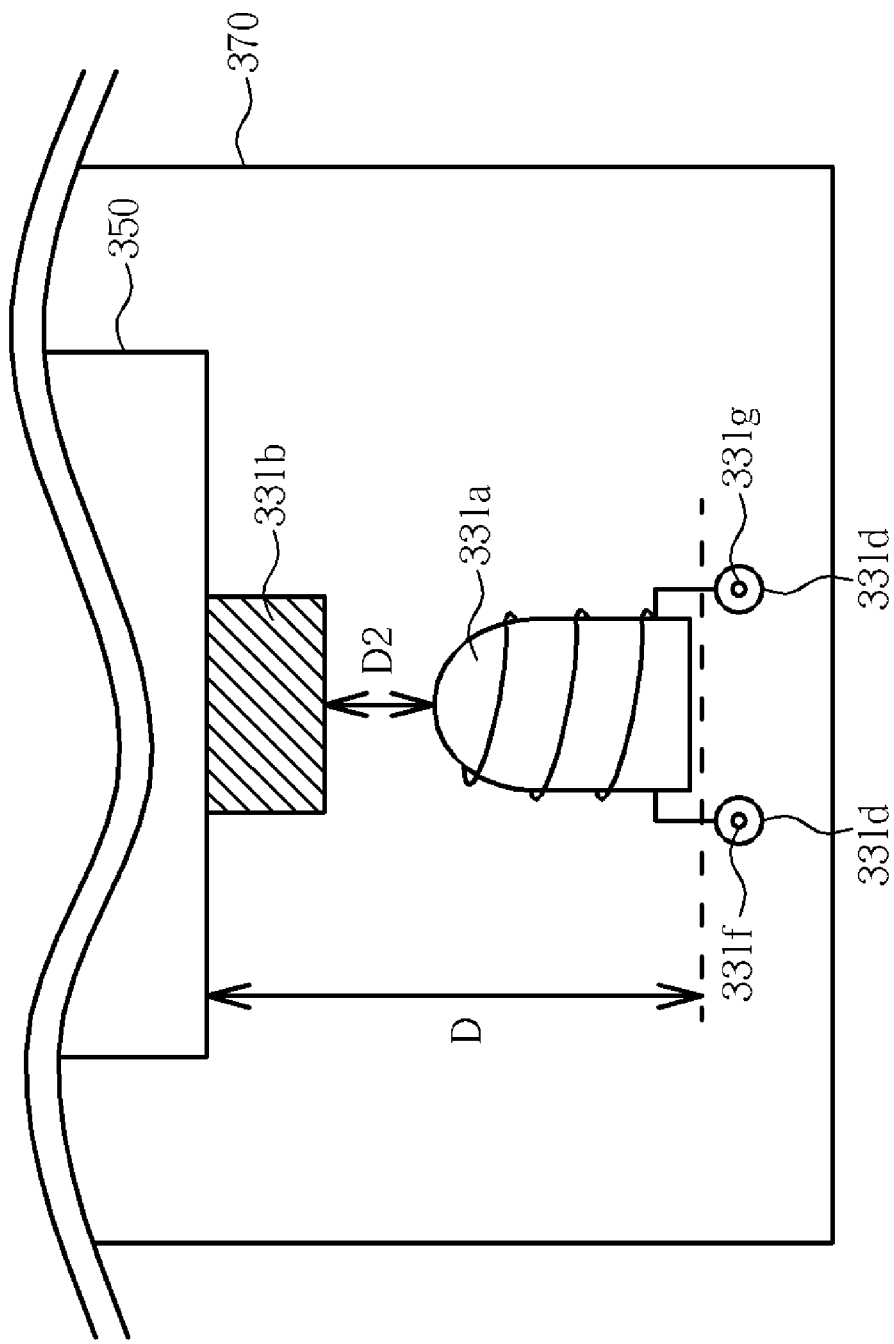
FIG. 10 is a diagram illustrating the electromagnetic actuator of the present invention.

Please refer to FIG. 10. FIG. 10 is a diagram illustrating the electromagnetic actuator of the present invention. The actuators 331-334 can be realized with the electromagnetic actuators shown in FIG. 10. Take the actuator 331 for example. As shown in FIG. 10, the electromagnetic actuator 331 comprises electromagnet 331a and magnet 331b. The electromagnet 331a is fixed on the substrate 370. The magnet 331b is fixed on the carrier 350. The electromagnet 331a comprises an iron core and a conducting line wound around the iron core, conducting pads 331g and 331f. One end of the conducting line is coupled to the conducting pad 331g and the other end of the conducting line is coupled to the conducting pad 331f. Thus, the actuator control circuit 120 controls the current passing through the conducting line by transmitting voltages Va and Vb respectively to the conducting pads 331g and 331f. The current passing through the conducting line affects the magnet force of the electromagnet 331a. When the magnet force rises, the magnet 331b is attracted to be close to the electromagnet 331a. When the magnet force falls, the magnet 331b is attracted to be far from the electromagnet 331a. Thus, the electromagnetic actuator 331 controls the distance D2 between the electromagnet 331a and the magnet 331b. Consequently, the distance D is controlled and the position of the carrier 350 relative to the substrate 370 is controlled.

Figure 11:
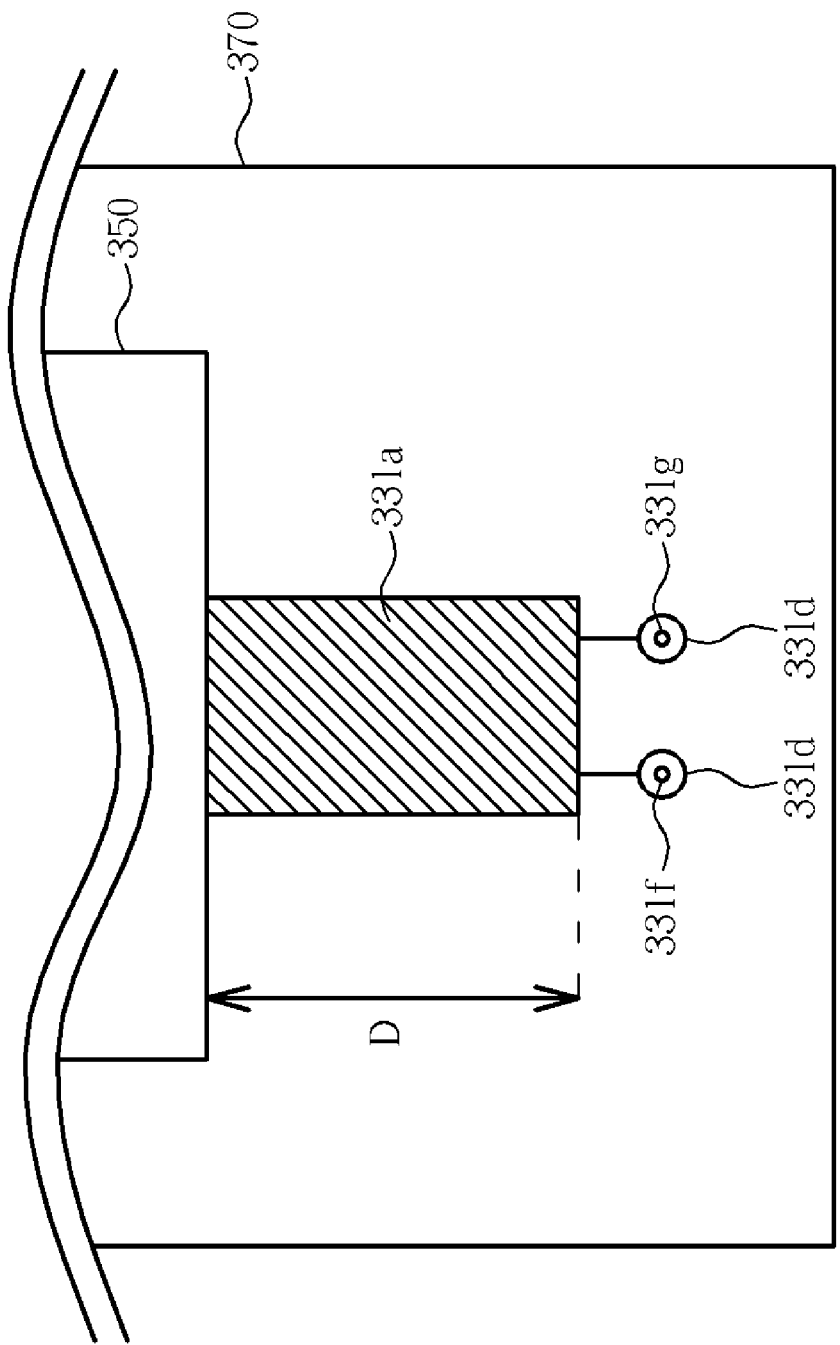
FIG. 11 is a diagram illustrating the piezoelectric actuator of the present invention.

Please refer to FIG. 11. FIG. 11 is a diagram illustrating the piezoelectric actuator of the present invention. The actuators 331-334 can be realized with the piezoelectric actuators shown in FIG. 11. Take the actuator 331 for example. As shown in FIG. 11, the piezoelectric actuator 331 comprises a piezoelectric medium 331a, two anchors 331d, and two conducting pads 331f and 331g. One end of the piezoelectric medium 331a is fixed on the substrate 370 and the other end of the piezoelectric medium 331a is fixed on the carrier 350. The piezoelectric medium can be poly-vinlidence fluoride (PVDF) or lead zirconate titanate (PZT). The characteristic of the piezoelectric medium is to expand when the piezoelectric medium receives voltages and the expansion is proportional to the received voltages. The anchors 331d are fixed on the substrate 370. The conducting pads 331g and 331f are respectively fixed on the anchors 331d and coupled to the piezoelectric medium 331a through conducting lines. Therefore, the actuator control circuit 120 transmits voltages Va and Vb respectively to the conducting pads 331g and 331f to control the expansion of the piezoelectric medium 331a. Therefore, the actuator control circuit 120 controls the position of the carrier 350 relative to the substrate 370 by controlling the difference between the voltages Va and Vb.

Additionally, the substrate mentioned in the present invention can be a glass substrate. The anchors, flexible suspensions, and the micro-actuators mentioned in the present invention can be generated by etching the silicon layer covering on the substrate.

Those skilled in the art will readily observe that numerous modifications and alterations of the device and method may be made while retaining the teachings of the invention.

What is claimed is:

1. A micro-optical image stabilizer coupled to an image processing circuit and an actuator control circuit for stabilizing an image sensor, the micro-optical image stabilizer comprising:
   a substrate;
   a carrier moveably arranged on the substrate for carrying the image sensor;
   at least one pair of flexible coupling members arranged correspondingly around the carrier, each flexible coupling member including:
     an anchor fixedly disposed on the substrate;
     a flexible suspension connecting the anchor and the carrier
   wherein the flexible coupling members jointly flexibly hold the carrier at a default position with respect to the substrate;
   at least one conducting member arranged on at least one of the flexible coupling members, the conducting member including:

a first conducting pad fixedly arranged on the anchor for establishing signal communication with the image processing circuit;

a second conducting pad fixedly arranged on the carrier and signal communicatively coupled to the image sensor, and a conducting line arranged on the flexible suspension and signal communicatively connecting the first conducting pad and the second conduction pad; and at least one micro-actuator fixedly disposed on the substrate and manipulatably coupled to the carrier for adjusting the position of the carrier relative to the substrate according to control signals of the actuator controlling circuit.

2. The micro-optical image stabilizer of claim 1 wherein the image sensor comprises:

an image sensing area for sensing an optical image and accordingly generating an electronic signal; and a third conducting pad coupled to the image sensing area for coupling to the second conducting pad and transmitting the electronic signal to the second conducting pad.

3. The micro-optical image stabilizer of claim 2 wherein the third conducting pad of the image sensor is coupled to the second conducting pad with flip chip or wire bonding techniques.

4. The micro-optical image stabilizer of claim 1 wherein the image sensing area of the image sensor is of a direction from the substrate to the carrier.

5. The micro-optical image stabilizer of claim 1 wherein the image sensing area of the image sensor is of a direction from the carrier to the substrate.

6. The micro-optical image stabilizer of claim 5 wherein the carrier comprises a hole positioned for the image sensing area, and the substrate comprises a hole positioned for the image sensing area.

7. The micro-optical image stabilizer of claim 1 further comprising a first isolation layer disposed between the substrate and the anchor.

8. The micro-optical image stabilizer of claim 7 further comprising a second isolation layer disposed between the flexible suspension and the conducting line, and the first conducting pad and the second conducting pad.

9. The micro-optical image stabilizer of claim 1 wherein the micro-actuator is a micro-electrostatic actuator.

10. The micro-optical image stabilizer of claim 9 wherein the micro-electrostatic actuator comprises:

a fixed component having a comb structure fixed on the substrate comprising a first conducting sub-pad coupled to the actuator controlling circuit for receiving a first voltage;

sub-anchor fixed on the substrate;

a flexible sub-suspension coupled to the sub-anchor of the micro-electrostatic actuator;

a second conducting sub-pad fixed on the sub-anchor for coupling to the actuator controlling circuit so as to receive a second voltage and transmit the second voltage to the flexible sub-suspension;

a moveable component having a comb structure fixed on the carrier coupled to the flexible sub-suspension for receiving the second voltage;

wherein a distance between the fixed component and the moveable component is decided by difference of the first voltage and the second voltage.

11. The micro-optical image stabilizer of claim 1 wherein the micro-actuator is a micro-electromagnetic actuator.

12. The micro-optical image stabilizer of claim 11 wherein the micro-electromagnetic actuator comprises:

a first anchor equipped with a first conducting pad coupled to the actuator control circuit for receiving a first voltage;

a second anchor equipped with a second conducting pad coupled to the actuator control circuit for receiving a second voltage;

a magnet fixed on the carrier; and an electromagnet fixed on the substrate comprising:

an iron core; and a conducting line wound around the iron core coupled between the first conducting pad and the second conducting pad for receiving the first voltage and the second voltage;

wherein a distance between the magnet and the electromagnet is decided by difference between the first voltage and the second voltage.

13. The micro-optical image stabilizer of claim 1 wherein the micro-actuator is a micro-piezoelectric actuator.

14. The micro-optical image stabilizer of claim 13 wherein the micro-piezoelectric actuator comprises:

a first anchor equipped with a first conducting pad coupled to the actuator control circuit for receiving a first voltage;

a second anchor equipped with a second conducting pad coupled to the actuator control circuit for receiving a second voltage; and a piezoelectric medium comprising a first end and a second end, the first end fixed on the carrier, and the second end fixed on the substrate coupled to the first conducting pad and the second conducting pad for receiving the first voltage and the second voltage;

wherein appearance of the piezoelectric medium changes when the piezoelectric medium receives the first voltage and the second voltage, and position of the carrier relative to the substrate is decided by difference between the first voltage and the second voltage.

15. The micro-optical image stabilizer of claim 14 wherein the piezoelectric medium is Poly-Vinyli Dence Fluoride (PVDF).

16. The micro-optical image stabilizer of claim 1 wherein the micro-actuator is a micro-thermoelectric actuator.

17. The micro-optical image stabilizer of claim 16 wherein the micro-thermoelectric actuator comprises:

a first anchor equipped with a first conducting pad coupled to the actuator control circuit for receiving a first voltage;

a second anchor equipped with a second conducting pad coupled to the actuator control circuit for receiving a second voltage;

a pivot disposed on the carrier;

a low-resistance resistor comprising a first end and a second end, the first end fixed on the substrate and coupled to the first conducting pad for receiving the first voltage, and the second end fixed on the pivot; and a high-resistance resistor comprising a first end and a second end, the first end fixed on the substrate and coupled to the second conducting pad for receiving the second voltage, and the second end fixed on the pivot coupled to the second end of the low-resistance resistor;

wherein temperature of the low-resistance resistor changes when the low-resistance resistor receives the first voltage;

wherein temperature of the low-resistance resistor changes when the high-resistance resistor receives the second voltage;

wherein position of the carrier relative to the substrate is decided by difference between the first and the second voltages.

18. The micro-optical image stabilizer of claim 1 wherein the substrate is a glass substrate.

19. The micro-optical image stabilizer of claim 1 wherein the anchor, the flexible suspension, and the micro-actuator are formed by etching thin silicon film covering on the substrate.

* * * * *